March 13, 1956  J. A. ZWASKA  2,738,221
DETACHABLE HOOD FOR REAR WINDOW OF A VEHICLE
Filed Jan. 13, 1953
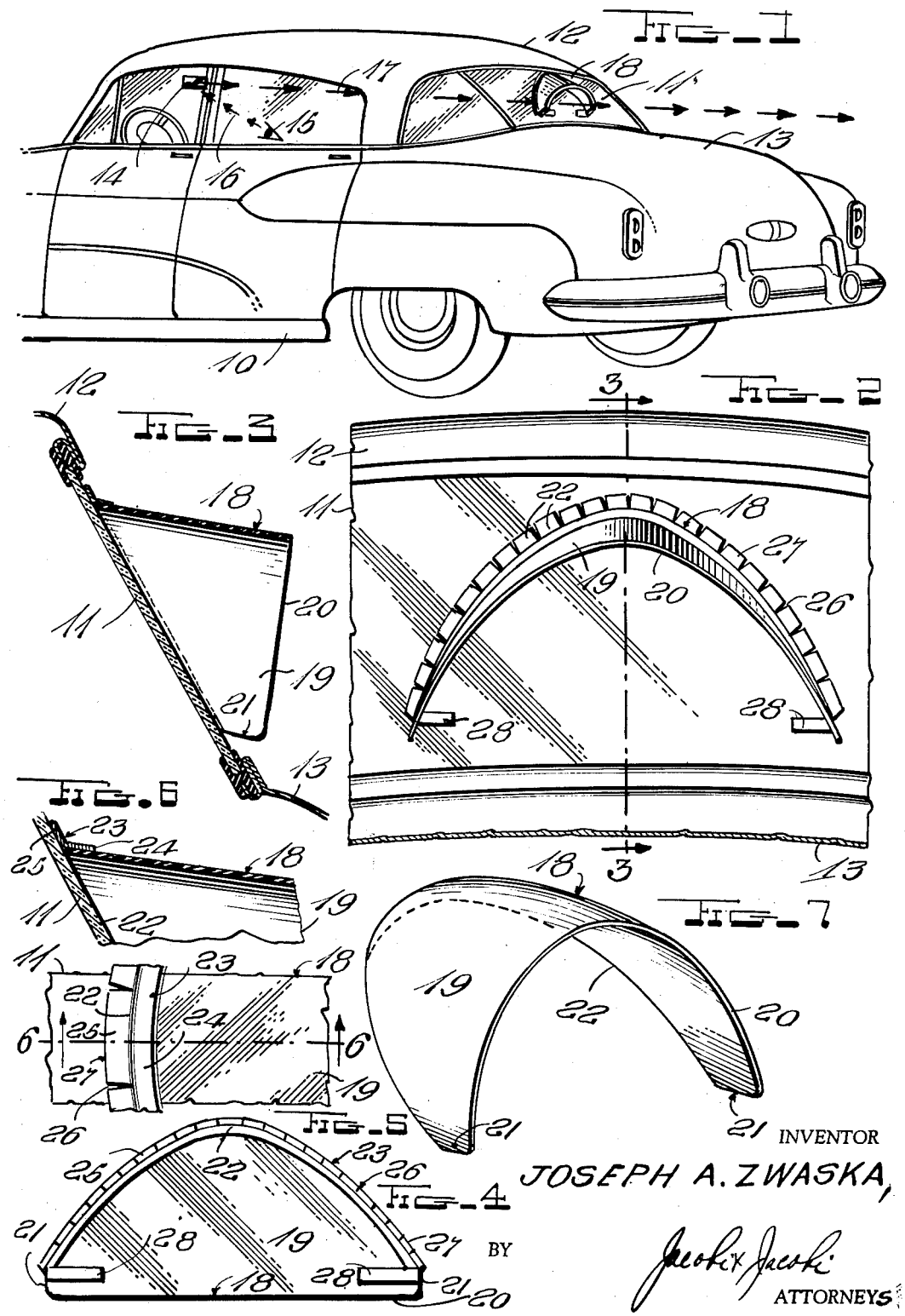
INVENTOR
JOSEPH A. ZWASKA,
BY
ATTORNEYS

United States Patent Office 2,738,221
Patented Mar. 13, 1956

2,738,221

DETACHABLE HOOD FOR REAR WINDOW OF A VEHICLE

Joseph A. Zwaska, Madison, Wis.

Application January 13, 1953, Serial No. 330,997

2 Claims. (Cl. 296—95)

This invention relates to vehicle accessories and more particularly to a detachable hood which may be applied to the rear window of an automobile or other vehicle.

As is well known most modern automobiles are provided with an inclined rear window which during snow or rain storms frequently becomes covered with sufficient snow or rain to materially obscure vision through such rear window either by way of the conventional rear view mirror or by direct vision by the driver of the vehicle.

Such a condition is of course, a serious driving hazard and is also extremely inconvenient in that the driver must either remove the accumulated deposit of snow or rain prior to starting of the vehicle or, if driving in a particularly heavy snow or rain storm, may be forced to make frequent stops in order to remove such deposits.

It is therefore an object of the present invention to provide a detachable transparent hood of simple and economical construction which may be conveniently applied to the rear window of a vehicle when necessary, and removed therefrom during periods of clear weather.

It is a further object of the invention to provide a detachable transparent hood for application to the rear window of an automobile or other vehicle which hood may be easily bent in such a manner as to provide one edge which conforms to the surface of the window.

Another object of the invention is the provision of a transparent hood for application to the rear window of an automobile or other vehicle, and incorporating waterproof adhesive means for securing the hood to the surface of the window.

Another object of the invention is the provision of a flexible, transparent hood for application to the rear window of an automobile or other vehicle, which hood may be supplied in a form of a pre-cut substantially plane sheet of flexible material, and having an adhesive tape secured to one edge thereof to facilitate attachment of the hood to the window.

A still further object of the invention is the provision of a flexible transparent hood for application to the rear window of an automobile or other vehicle with the hood formed in such a manner that during forward motion of the vehicle air will flow into the hood thereby preventing the formation of a partial vacuum therein.

A further object of the invention is the provision of a flexible transparent hood for application to the rear window of an automobile or other vehicle which hood may be rapidly and economically manufactured in mass production thereby permitting sale in a highly competitive market.

A still further object of the invention is the provision of a flexible transparent hood for application to the rear window of an automobile or other vehicle, which hood is of universal application and may be applied to any window regardless of the inclination or contour thereof.

Further objects and advantages of the invention will be apparent from the following description taken in conjunction with the accompanying drawings, wherein:

Fig. 1 is a fragmentary perspective view of an automobile with the hood of this invention applied to the rear window;

Fig. 2 a fragmentary rear elevational view of the hood of this invention in place on the rear window of an automobile;

Fig. 3 a sectional view on the line 3—3 of Fig. 2;

Fig. 4 a plan view of the hood of this invention prior to shaping the same for application to the rear window of an automobile;

Fig. 5 a fragmentary top plan view of the hood of this invention in place on the inclined rear window of an automobile;

Fig. 6 a sectional view on the line 6—6 of Fig. 5; and

Fig. 7 a perspective view of the hood of this invention bent to the proper shape for application to the rear window of an automobile.

With continued reference to the drawing there is shown in Fig. 1 an automobile 10 having a rear window 11 extending between the roof 12 and the rear deck 13 at a substantial inclination. The automobile 10 is provided with the usual rear view mirror 14 and the normal line of sight from the driver's eye 15 is along the line 16 to the mirror 14 and rearwardly along the line 17 through the rear window 11.

Due to the inclination of the rear window 11 snow or rain tends to collect thereon and obstruct the vision of the driver through the rear view mirror 14 or when turning around to look through the rear window 11 and in order to prevent such obstruction of vision there is provided by this invention a hood 18 constructed of transparent flexible material such as a suitable plastic or the like. The hood 18 is provided with means to attach the same securely to the rear window 11 and to permit removal thereof and reattachment when necessary.

The hood 18 prior to attachment to the rear window 11 may, as shown in Fig. 4, take the form of a substantially plane sheet of flexible transparent material 19 having one edge 20 extending across the entire width thereof in a substantially straight line and with two relatively short side edges 21 extending from the ends of the edge 20 at substantially right angles thereto. The side edges 21 are connected by a curved edge 22 of substantially parabolic form the sheet 19 being conveniently formed by a die cutting or other suitable operation.

Fastening means for securing the hood 18 to the rear window 11 of the automobile 10 is provided in the form of a waterproof tape 23 having one side coated with a suitable waterproof pressure sensitive adhesive, one portion 24 of the tape being secured to the sheet 19 along the curved edge 22 and with a portion 25 of the tape extending outwardly from the curved edge 22. The portion 25 of the tape 23 is provided with a series of spaced transverse slits 26 extending across the tape to a point adjacent the curved edge 22 of the sheet 19. Slits 26 serve to provide a series of relatively short tabs 27 the purpose of which will be presently described. The tape 23 terminates at each end in a relatively long tab 28.

The hood 18 of this invention is normally supplied in flat pre-cut form as shown in Fig. 4 and prior to application of the same to the rear window 11 of the automobile 10 is bent to substantially the form shown in Fig. 7 at which time the curved edge 22 will substantially conform to the contour of the outer surface of the window 11. The slits 26 permit such bending of the sheet 19 without stretching or wrinkling of the tape, these slits 26 forming V-shaped notches after bending of sheet 19 as shown in Figs. 2 and 5. The hood 18 is attached to the rear window 11 by pressing the adhesive coated side of the tabs 27 into firm engagement with the surface of the window 11 and by also pressing the tabs 28 against the window surface. As best shown in Fig. 2 the tabs 28 extend inwardly toward each other from the ends of the curved hood 18 and prevent outward movement of such ends due to the resiliency of the material.

As stated above the hood 18 is normally supplied in the flat form shown in Fig. 4 and if desired the adhesive coated side of the outwardly extending portion 25 of the tape 23 may be covered with cloth, paper or other suitable material in order to protect such adhesive coated surface and prevent damage thereto by inadvertent contact with other objects, this covering being removable prior to application of the hood 18 to the window 11. Also the above mentioned covering may be omitted and the outwardly extending portion 25 of the tape 23 folded back into engagement with the inner side of the sheet 19, this portion 25 being stripped from the sheet 19 prior to application of the hood 18 to the window 11.

As is well known the forward motion of a vehicle such as the automobile 10 shown in Fig. 1 causes a partial vacuum adjacent the surface of the rear window 11 and such partial vacuum would normally cause the entry of snow or rain within the hood 18 which snow or rain would settle on the surface of the window 11 within the hood 18 and obstruct the driver's vision. In order to prevent the collection of snow or rain within the hood 18 the relatively short side edges 21 are formed in such a manner that they occupy a position above the outer surface of the window 11 as best shown in Fig. 3. This arrangement permits the flow of air around the side edges 21 and into the hood 18 thus preventing formation of a partial vacuum therein, thereby excluding snow or rain therefrom.

The hood 18 may be attached or removed from the window 11 as often as desired since the adhesive properties of the tape 23 are in nowise destroyed thereby, and since upon removal from the window 11 the hood 18 will automatically resume a substantially flat or plane condition as in Fig. 4, storage of the same is materially facilitated and obviously this flat or plane formation also materially facilitates shipment and storage of the hoods prior to sale.

It will be seen that by the above described invention there has been provided an extremely simple and economical hood which may be conveniently stored and applied to the rear window of an automobile when desired in order to prevent the accumulation of snow or rain thereon and which may be removed when not required. The provision of this hood permits clear unobstructed vision for the driver of the automobile and thus serves as both a convenience and a safety measure.

It will be obvious to those skilled in the art that various changes may be made in the invention without departing from the spirit and scope thereof, and therefore the invention is not limited by that which is shown in the drawing and described in the specification but only as indicated in the appended claims.

What is claimed is:

1. A detachable hood for the rear window of a vehicle comprising a flat sheet of transparent flexible material having one edge extending across the entire width thereof in a substantially straight line, a relatively short side edge extending from each end of said one edge substantially at right angles thereto, a curved edge of substantially parabolic form connecting said side edges, a tape coated on one side with a waterproof pressure sensitive adhesive secured to said sheet along said curved edge with a potrion of said tape extending outwardly of said curved edge, slits in said outwardly extending portion of said tape providing a series of relatively short tabs, said tape terminating at each end in a relatively long tab whereby said sheet may be bent to a substantially parabolic shape with said curved edge conforming to the inclined surface of the rear window of said vehicle and said sheet removably secured to said window by engagement of the adhesive coated side of said tabs therewith to form a hood, said long tabs serving to hold the side edges of said hood against outward movement due to the resiliency of the material, said side edges being out of contact with and above said inclined surface whereby upon forward movement of said vehicle air will flow around said side edges and into said hood thereby preventing formation of a partial vacuum therein.

2. A detachable hood for the rear window of a vehicle comprising a flat sheet of transparent flexible material having one edge extending across the entire width thereof, a relatively short side edge extending from each end of said one edge substantially at right angles thereto, a curved edge of substantially parabolic form connecting said side edges, a tape coated on one side with a waterproof pressure sensitive adhesive secured to said sheet along said curved edge with a portion of said tape extending outwardly of said curved edge, slits in said outwardly extending portion of said tape providing a series of relatively short tabs whereby said sheet may be bent to a substantially parabolic shape with said curved edge conforming to the inclined surface of the rear window of said vehicle and said sheet removably secured to said window by engagement of the adhesive coated side of said tabs wherewith to form a hood, said side edges being out of contact with and above said inclined surface whereby upon forward movement of said vehicle air will flow around said side edges and into said hood thereby preventing formation of a partial vacuum therein.

References Cited in the file of this patent

UNITED STATES PATENTS

| | | |
|---|---|---|
| 1,450,551 | Illch | Apr. 3, 1923 |
| 2,318,143 | Cutting | May 4, 1943 |
| 2,338,199 | Parke | Jan. 4, 1944 |
| 2,539,763 | Wilson | Jan. 30, 1951 |
| 2,546,609 | Morris | Mar. 27, 1951 |

FOREIGN PATENTS

| | | |
|---|---|---|
| 238,908 | Great Britain | of 1927 |

OTHER REFERENCES

The Automobile, of July 22, 1915, pp. 164 and 165, Illustrations of Rainshield of Frey Mfg. Co., Chicago, Ill.